United States Patent
Baum et al.

(10) Patent No.: US 12,285,014 B2
(45) Date of Patent: Apr. 29, 2025

(54) AQUEOUS 1,2-BENZISOTHIAZOLIN-3-ONE CONCENTRATES

(71) Applicant: THOR GMBH, Speyer (DE)

(72) Inventors: Rudiger Baum, Neulussheim (DE); Thomas Wunder, Neustadt a.d. Weinstrasse (DE); Hans-Jurgen Schmidt, Speyer (DE); Peter Erich Hahn, Lampertheim (DE)

(73) Assignee: Thor GmbH, Speyer (DE)

( * ) Notice: Subject to any disclaimer, the term of this patent is extended or adjusted under 35 U.S.C. 154(b) by 875 days.

(21) Appl. No.: 17/285,152

(22) PCT Filed: Nov. 25, 2019

(86) PCT No.: PCT/EP2019/000319
§ 371 (c)(1),
(2) Date: Apr. 14, 2021

(87) PCT Pub. No.: WO2020/108784
PCT Pub. Date: Jun. 4, 2020

(65) Prior Publication Data
US 2021/0360923 A1    Nov. 25, 2021

(30) Foreign Application Priority Data

Nov. 30, 2018 (DE) ................................ 18000931.8

(51) Int. Cl.
| *A01N 43/80* | (2006.01) |
| *A01N 25/02* | (2006.01) |
| *A01N 43/40* | (2006.01) |
| *A01P 1/00* | (2006.01) |

(52) U.S. Cl.
CPC ............ *A01N 43/80* (2013.01); *A01N 25/02* (2013.01); *A01N 43/40* (2013.01); *A01P 1/00* (2021.08)

(58) Field of Classification Search
CPC ........ A01N 43/80; A01N 25/02; A01N 43/40; A01P 1/00
See application file for complete search history.

(56) References Cited

U.S. PATENT DOCUMENTS

| 4,871,754 A | 10/1989 | Bauer et al. |
| 2015/0126479 A1 | 5/2015 | Premachandran et al. |

FOREIGN PATENT DOCUMENTS

| DE | 2840273 A1 | 4/1979 | |
| EP | 1902617 A2 | 3/2008 | |
| EP | 1908349 A2 | 4/2008 | |
| EP | 3360413 A1 * | 8/2018 | |
| WO | WO 94/16564 A1 | 8/1994 | |
| WO | WO 2012/158425 A1 | 11/2012 | |
| WO | WO-2014088806 A1 * | 6/2014 | ............. A01N 25/02 |
| WO | PCT/EP2019/000319 | 11/2019 | |

OTHER PUBLICATIONS

PCT/EP2019/000319, Nov. 25, 2019, WO 2020/108784 A1.

\* cited by examiner

*Primary Examiner* — John S Kenyon
*Assistant Examiner* — Rehana Ismail
(74) *Attorney, Agent, or Firm* — McCarter & English, LLP

(57) ABSTRACT

The invention relates to an aqueous biocide composition, containing the following components: (a) 9 wt. % to 20 wt. % 1,2-benzisothiazolin-3-one, (b) a dissolved alkalizing agent, containing 0.95 to 1.05 mol sodium and potassium hydroxide, each based on one mol of the 1,2-benzisothiazolin-3-one present as component (a), and (c) more than 60 wt. % water. The biocide composition is characterized in that the composition: (i) has a pH value in the range of pH 9.5 to pH 11.9, and (ii) the molar fraction of sodium ions, based on the sodium and potassium ions present in the composition, is in the range of 15 to 45 mol %. The invention furthermore relates to the use of these biocide compositions for preserving water-based products of all kinds, such as cleaning and household products, plastic dispersions, paints, plasters, adhesives, sealing compounds, paper coating compounds, textile softening and sizing agents, detergent base materials, surfactants, polishing agents, spinning baths, cooling lubricants, leather treatment agents, and silicone and bitumen emulsions.

12 Claims, No Drawings ated filing of International Application No. PCT/EP2019/000319, filed on Nov. 25, 2019, which claims priority to German Patent Application 18000931.8, filed on Nov. 30, 2018.

AQUEOUS 1,2-BENZISOTHIAZOLIN-3-ONE CONCENTRATES

CROSS-REFERENCE TO RELATED APPLICATIONS

This application is a 35 U.S.C. § 371 National Stage filing of International Application No. PCT/EP2019/000319, filed on Nov. 25, 2019, which claims priority to German Patent Application 18000931.8, filed on Nov. 30, 2018.

The invention relates to an aqueous biocide composition, containing the following components: (a) 9 wt. % to 20 wt. % 1,2-benzisothiazolin-3-one, (b) a dissolved alkalizing agent, containing 0.95 to 1.05 mol sodium and potassium hydroxide, each based on one mol of the 1,2-benzisothiazolin-3-one contained as component (a), and (c) more than 60 wt. % water. The biocide composition is characterized in that the composition: (i) has a pH value in the range of pH 9.5 to pH 11.9, and (ii) the molar fraction of sodium ions, based on the sodium and potassium ions contained in the composition, is in the range of 15 to 45 mol %. The invention furthermore relates to the use of these biocide compositions for preserving water-based products of all kinds, such as cleaning and household products, plastic dispersions, paints, plasters, adhesives, sealing compounds, paper coating compounds, textile softening and sizing agents, detergent base materials, surfactants, polishing agents, spinning baths, cooling lubricants, leather treatment agents, and silicone and bitumen emulsions.

The 1,2-benzisothiazolin-3-one (BIT) is, or the sodium, potassium and lithium salts thereof are, an active ingredient for producing microbicidally active formulations which has been used in practice for quite some time. The active ingredient is characterized by favorable chemical and thermal stability and generally exhibits a broad antimicrobial effect against bacteria, fungi, and yeasts.

To make this active ingredient available in an easy-to-handle and easy-to-dose form, aqueous dispersions or aqueous solutions are usually prepared from the raw BIT that is obtained during synthesis.

To produce what are presumed to be more stable aqueous BIT solutions, according to the teaching of DE 28 40 273 A1, organic solvents containing certain hydroxyl groups, such as propylene glycol, are added to the BIT in the form of the alkali salt thereof, which is dissolved in water.

Furthermore, U.S. Pat. No. 4,871,754 discloses aqueous formulations of the lithium salt of 1,2-benzisothiazolin-3-one. These preparations, however, are not sufficiently stable in higher BIT concentrations at cold temperatures, and necessitate the addition of a water-miscible organic solvent, such as 1,2 propylene glycol.

However, the aforementioned formulations, which include solvents, such as glycols, are not cost-effective from economical perspectives, and additionally are not very environmentally friendly or not biodegradable. It is therefore advantageous to be able to resort to as highly concentrated aqueous solutions of 1,2-benzisothiazolin-3-one as possible, which are free of glycol-based solvents.

The unexamined PCT patent application WO 2012/158425 A1 discloses highly concentrated aqueous solutions of 1,2-benzisothiazolin-3-one that comprise approximately 0.1 to approximately 30 wt. % 1,2-benzisothiazolin-3-one, approximately 5 to 15 wt. % alkali metal salt, approximately 50 to approximately 85 wt. % water, and approximately 0.1 to approximately 5 wt. % chelating agents. During the replication of compositions according to this publication, however, it was found that these are not sufficiently stable when stored.

In addition, aqueous solutions of 1,2-benzisothiazolin-3-one, having a content of 1,2-benzisothiazolin-3-one of 9.08 or 9.38 wt. %, are commercially available. For example, Troy Corporation sells an aqueous 1,2-benzisothiazolin-3-one solution under the brand name Mergal® K10N which has a pH value of 12.85 and contains 9.38 wt. % 1,2-benzisothiazolin-3-one in the form of the potassium salt thereof. Furthermore, Lonza Group AG sells an aqueous 1,2-benzisothiazolin-3-one solution under the brand name Proxel® AQ which has a pH value of 11.7 and contains 9.08 wt. % 1,2-benzisothiazolin-3-one in the form of the potassium salt thereof.

Proceeding from the prior art, it is the object of the invention to provide aqueous 1,2-benzisothiazolin-3-one compounds, which have as high a content as possible of 1,2-benzisothiazolin-3-one, preferably up to 15 wt. %, which are more stable compared to the compositions known from the prior art. It is another object of the invention to provide stable aqueous 1,2-benzisothiazolin-3-one compositions that are as highly concentrated as possible and that are free of VOC-containing solvents and free of glycol-based solvents.

This object is achieved by an aqueous biocide composition, containing the following components:
(a) 9 wt. % to 20 wt. % 1,2-benzisothiazolin-3-one;
(b) a dissolved alkalizing agent, containing 0.95 to 1.05 mol sodium and potassium hydroxide, each based on one mol of the 1,2-benzisothiazolin-3-one contained as component (a), and
(c) more than 60 wt. % water,
characterized in that the composition:
(i) has a pH value in the range of pH 9.5 to pH 11.9; and
(ii) the molar fraction of sodium ions, based on the sodium and potassium ions contained in the composition, is in the range of 15 to 45 mol %.

Surprisingly, novel aqueous biocide compositions, which are more stable than the compositions known from the prior art, based on 1,2-benzisothiazolin-3-one, hereafter also referred to as BIT, were discovered within the scope of the present invention, which advantageously overcome the disadvantages of the prior art. In particular, aqueous 1,2-benzisothiazolin-3-one compositions having a content of 1,2-benzisothiazolin-3-one in the range of 9 wt. % to 20 wt. %, preferably in the range of 9 to 15 wt. %, particularly preferably in the range of 9 to 10.5 wt. % are provided within the scope of the present invention, which, due to the higher 1,2-benzisothiazolin-3-one content, are characterized by being easier to dose than the presently available 1,2-benzisothiazolin-3-one compositions. The biocide compositions are furthermore characterized by advantageous viscosity and improved storage and color stability.

Within the scope of the present invention, biocide compositions are provided that exhibit improved storage stability compared to the compositions known from the prior art. Storage-stable shall be understood to mean that almost no separation of solids occurs with extended storage in the case of the compositions according to the invention.

Within the scope of the invention, it was found that biocide compositions according to the invention, having a content of 1,2-benzisothiazolin-3-one of 9 to 20 wt. %, can be obtained, which exhibit sufficient storage stability at room temperature up to approximately 19° C., despite the high content of 1,2-benzisothiazolin-3-one. Such compositions are advantageously utilized seasonally or used in warmer regions in which the storage and application temperatures are not below 19° C.

Within the scope of the inventions, additionally biocide compositions, having a content of 1,2-benzisothiazolin-3-one of 9 to 15 wt. %, were obtained which exhibit sufficient storage stability at room temperature up to approximately 10° C., despite the high content of 1,2-benzisothiazolin-3-one. Such compositions are advantageously utilized seasonally or used in regions in which the storage and application temperatures are not below 10° C.

Within the scope of the invention, biocide compositions having a content of 1,2-benzisothiazolin-3-one in the range of 9 to 10.5 weight have proven to be particularly stable. These compositions are advantageously characterized in that almost no separation of solids occurs during extended storage and that they do not crystallize or solidify even at sustained temperatures of approximately 2° C.

As component (a), the biocide composition according to the invention contains 9 wt. % to 20 wt. %, preferably 9 to 15 wt. %, particularly preferably 9 to 11.5 wt. %, and most particularly preferably 9.5 to 10.5 wt. % 1,2-benzisothiazolin-3-one, in each case based on the total weight of the biocide composition. The amount of the alkalizing agent contained in the composition, which was used to dissolve the 1,2-benzisothiazolin-3-one, is not taken into consideration in the calculation of the amount of the 1,2-benzisothiazolin-3-one in the biocide composition. As a result, only the biocide 1,2-benzisothiazolin-3-one is taken into consideration as component (a).

As component (b), the biocide composition according to the invention contains an alkalizing agent dissolved in the composition, which contains 0.95 mol to 1.05 mol, preferably 0.97 to 1.03 mol, particularly preferably 0.98 to 1.02 mol sodium and potassium hydroxide, each based on one mol of the 1,2-benzisothiazolin-3-one contained as component (a). Composition (b), the mixture that is contained in the composition in dissolved form and made up of sodium and potassium hydroxide, which is contained in the composition in an approximately equimolar manner with respect to component (a), causes component (a), the 1,2-benzisothiazolin-3-one, to be present in the composition in the form of the dissolved sodium and potassium salt thereof. Through the combined use of potassium and sodium hydroxide as a neutralizing agent within the claimed range, instead of the lithium hydroxide called for in the U.S. Pat. No. 4,871,754, it is possible to obtain considerably less expensive and likewise stable biocide composition compared to the prior art.

The biocide composition according to the invention comprises more than 60 wt. % water, in which components (a) and (b) are dissolved, as component (c). According to a preferred embodiment of the invention, the biocide composition according to the invention is characterized by having a water content in the range of 70 wt. % to 89 wt. %, and preferably a water content in the range of 81 wt. % to 89 wt. %, in each case based on the total weight of the biocide composition. The biocide composition according to the invention preferably contain deionized water or soft water as water. In the event that the biocide compositions according to the invention should also contain non-deionized water, that is, also traces of Ca and Mg ions, as the water, according to an advantageous embodiment of the invention the compositions should furthermore contain complexing agents known to a person skilled in the art.

According to the invention, the biocide composition is characterized by having a pH value in the range of pH 9.5 to pH 11.9, and preferably in the range of pH 10.0 to pH 11.5, according to feature (i).

According to the invention, the biocide composition is furthermore characterized in that, according to feature (ii), the molar fraction of sodium ions, based on the sodium and potassium ions contained in the composition, is in the range of 15 to 45 mol %, and preferably in the range of 20 to 39 mol %.

As a result of the combined use of potassium and sodium hydroxide as a neutralizing agent within the claimed range, as well as the molar fractions of sodium and potassium ions in the composition (feature (ii)), it is possible to obtain considerably less expensive and surprisingly stable biocide compositions compared to the prior art.

The stable biocide compositions according to the invention have a viscosity, measured according to Brookfield at 20° C. using spindle 1 at 30 rpm, of less than 50 mPas, and preferably less than 10 mPas.

According to an embodiment of the invention, the biocide composition according to the invention furthermore contains at least one 2-mercaptopyridine N-oxide, or the salt thereof dissolved in the composition, as component (d). Examples of salts of 2-mercaptopyridine N-oxide are alkali, alkaline earth and amine salts and quaternary ammonium salts, for example Na, K, Li, Ca, Mg, ammonium, 2-hydroxyethylammonium and -triethylammonium salts and mixtures thereof. The sodium salt of the 2-mercaptopyridine N-oxide is preferred. According to a preferred embodiment, component (d) is contained in the composition in the form of a salt, for example as sodium pyrithione. In a preferred embodiment, the amount of component (d) in the preparation according to the invention is 1 to 15 wt. %, preferably 1 to 12 wt. %, and more preferably 2.5 to 10 wt. %, in each case based on the total weight of the biocide composition.

It is known to a person skilled in the art that components (a), (b) and optionally (d) required according to the invention may react with one another. For example, the (a) 1,2-benzisothiazolinone and/or (d) the 2-mercaptopyridine N-oxide may form a salt with (b) the alkalizing agent. The invention accordingly also relates to a preparation produced by mixing components (a) to (c), and optionally (d).

In addition to components (a), (b), (c) and optionally (d), the biocide compositions according to the invention, if necessary, optionally contain further components, such as thickeners, defoamers and dispersants. These are known to a person skilled in the art and are contained in the composition in the appropriate quantity, as needed.

A composition, exclusively containing components (a), (b), (c) and optionally (d) in the indicated weight ratios, without the presence of a further microbicidal active component, is referred to as a "biocide composition according to the invention" within the scope of the present invention. In addition to components (a), (b), (c) and optionally (d) in the indicated weight ratios, the "biocide composition according to the invention" can also have one or more further ingredients. The further ingredient or ingredients may have a microbicidal effect, or they may not have a microbicidal effect, that is, they may be a solvent, dispersant or suspending agent, for example.

In another embodiment, the "biocide composition according to the invention" is composed of components (a), (b), (c) and optionally (d) in the quantity ratios indicated above (that is, the biocide composition according to the invention). This means that the composition according to the invention exclusively contains components (a), (b) and (c), and optionally (d).

In another embodiment of the invention, the biocide composition according to the invention is "substantially" composed of components according to the invention, (a), (b), (c) and optionally (d), that is, in addition to these, it is also possible that one or even multiple other biocides are present, but that these are present in such an amount that the respective biocide which is different from the components of the microbicidal active components according to the invention makes no contribution to the overall effect of the resulting mixture.

According to a preferred embodiment of the invention, the composition according to the invention is substantially free of volatile organic compounds (VOC), glycols, derivatives of glycols, such as 1,2-propanediol, glycerol and/or derivatives of glycerol. In the present context, "substantially free" shall be understood to mean that the composition contains 0 to 5 wt. %, preferably 0 to 2 wt. %, and particularly preferably 0 to 0.5 wt. % volatile organic compounds (VOCs), glycols, derivatives of glycols, glycerol and/or derivatives of glycerol. According to a particularly preferred embodiment [of the] invention, the composition according to the invention is free of volatile organic compounds (VOCs), glycols, derivatives of glycols, glycerol and/or derivatives of glycerol. According to a further preferred embodiment [of the] invention, the composition according to the invention is characterized in that the composition contains less than 1 wt. % 1,2-propanediol.

The biocide composition according to the invention can be produced by suspending the 1,2-benzisothiazolin-3-one, preferably in the form of a moist filter cake, in water at a temperature of approximately 20 to 60° C., while stirring. Thereafter, potassium hydroxide and also sodium hydroxide are added in the form of an aqueous solution. The resulting mixture is stirred at a temperature of approximately 20 to 60° C. until the solids have dissolved. The obtained biocide composition can then optionally be filtered, either while warm or after cooling to ambient conditions.

The invention furthermore relates to the use of the above-defined biocide compositions for preserving hydrous or water-dilutable technical materials or products against being infected and/or destroyed by microorganisms. The compositions according to the invention can preferably be used to preserve functional liquids and hydrous technical products that are susceptible to microbial infection.

Due to the broad spectrum of activity of the BIT, the use of the biocide compositions according to the invention is particularly suitable for preserving cleaning and household products, plastic dispersions, paints, plasters, adhesives, sealing compounds, paper coating compounds, textile softening and sizing agents, detergent base materials, surfactants, polishing agents, spinning baths, cooling lubricants, leather treatment agents, and silicone and bitumen emulsions. The biocide compositions according to the invention are particularly preferably suitable for conserving cooling lubricants, cleaning products and household products.

The application concentrations of the biocide composition to be used according to the invention depends on the manner and the prevalence of the microorganisms to be combated, the initial microbial load, as well as the composition of the technical product or material to be protected. The optimal amount used for a certain application can be ascertained in the laboratory through test series, prior to the use in practice. In general, the application concentrations are in the range of 0.01 to 5 wt. %, and preferably of 0.05 to 1.0 wt. % of the biocide composition according to the invention, based on the technical product or material to be protected.

According to one embodiment, the invention thus also relates to a hydrous technical product, selected from cleaning and household products, plastic dispersions, paints, plasters, adhesives, sealing compounds, paper coating compounds, textile softening and sizing agents, detergent base materials, surfactants, polishing agents, spinning baths, cooling lubricants, leather treatment agents, and silicone and bitumen emulsions, which contains the biocide composition according to the invention preferably in an amount in the range of 0.01 to 5 wt. %, and preferably of 0.05 to 1.0 wt. %, based on the technical product to be protected.

The invention furthermore relates to a method for controlling the growth of at least one microorganism in an aqueous liquid, comprising the step of adding a biocide composition, containing the following components:

(a) 9 wt. % to 20 wt. % 1,2-benzisothiazolin-3-one;
(b) a dissolved alkalizing agent, containing 0.95 to 1.05 mol sodium and potassium hydroxide, each based on one mol of the 1,2-benzisothiazolin-3-one present as component (a), and
(c) more than 60 wt. % water, characterized in that the composition:
(i) has a pH value in the range of pH 9.5 to pH 11.9; and
(ii) the molar fraction of sodium ions, based on the sodium and potassium ions present in the composition, is in the range of 15 to 45 mol, to an aqueous liquid, so that the growth of the at least one microorganism in the liquid is inhibited or at least impaired. According to one embodiment of the invention, the aqueous liquid is a cleaning or household product.

According to a preferred embodiment of the invention, the biocide composition contains the following components, or consists of the following components:

FORMULATION EXAMPLE 1

(a) 10 wt. % 1,2-benzisothiazolin-3-one;
(b) 2.68 wt. % potassium hydroxide;
(c) 0.75 wt. % sodium hydroxide; and
(d) 86.57 wt. % water

FORMULATION EXAMPLE 2

(a) 9.25 wt. % 1,2-benzisothiazolin-3-one;
(b) 2.48 wt. % potassium hydroxide;
(c) 0.70 wt. % sodium hydroxide; and
(d) 87.57 wt. % water The following examples and comparative examples are used to further illustrate the present invention.

Examination of the Storage Stability of Biocide Compositions:

To examine the storage stability of biocide compositions having a 1,2-benzisothiazolin-3-one content in the range of 9.5 to 20 wt. %, the biocide compositions characterized in the tables below were produced and stored over a time period of 14 days at room temperature, 5° C., 2° C. and 0° C. (Table 1), or at room temperature, 12° C., 10° C., 5° C., 2° C., 0° C., −2° C. and −5° C. (Table 2), wherein inoculations were carried out 2 times with crystals of the contained BIT salts at respective intervals of 7 days.

As can be derived from Tables 1 and 2 shown below, it is possible, within the claimed range, to obtain compositions of the 1,2-benzisothiazolin-3-one having a 1,2-benzisothiazolin-3-one content of up to 20 wt. % which are stable when stored at lower temperature, in particular through the combined use of sodium hydroxide and potassium hydroxide as neutralizing agents.

Comparative Examples V6 and V7 were produced in accordance with Examples 8 and 9 of US2015/0126479A1. In the process, Comparative Example V6([1]) contained 2.4 wt. % tetrasodium N,N-bis(carboxylatomethyl)-L-glutamate, and Comparative Example V7([2]) contained 0.25 wt. % tetrasodium N,N-bis(carboxylatomethyl)-L-glutamate. As can be derived from the results shown in Table 1, it is not possible to obtain stable BIT concentrates, contrary to the teaching of US 2015/0126479A1.

TABLE 1

| Sample | Concentrations [wt. %] | | | | Stability | | | | | Molar ratio |
|---|---|---|---|---|---|---|---|---|---|---|
| | BIT | KOH | NaOH | pH | RT | 5° C. | 2° C. | 0° C. | | K/Na |
| V1 | 9.5 | 3.53 | — | 11.2 | + | ○ | − | − | | — |
| V2 | 10 | 3.72 | — | 11.3 | + | − | − | − | | — |
| V3 | 10 | — | 2.65 | 11.2 | − | − | − | − | | — |
| V4 | 10 | 1.86 | 1.33 | 11.3 | + | − | − | − | | 50/50 |
| V5 | 10 | 3.35 | 0.27 | 11.4 | + | − | − | − | | 90/10 |
| V6[1] | 19 | 6.25 | — | 9.4 | + | − | − | − | | 100/0 |
| V7[2] | 10 | 3.75 | — | 11.4 | + | − | − | − | | 100/0 |
| 1 | 10 | 2.98 | 0.53 | 11.2 | + | + | + | − | | 80/20 |
| 2 | 10 | 2.6 | 0.8 | 11.2 | + | + | + | ○ | | 70/30 |
| 3 | 10 | 2.42 | 0.93 | 11.1 | + | + | + | ○ | | 65/35 |
| 4 | 10 | 2.23 | 1.06 | 11.2 | + | + | + | − | | 60/40 |
| 5 | 10 | 2.87 | 0.54 | 10 | + | + | + | − | | 79/21 |
| 6 | 10 | 2.87 | 0.63 | 11 | + | + | + | − | | 77/23 |
| 7 | 10 | 2.87 | 0.75 | 12 | + | + | + | − | | 73/27 |

BIT: 1,2-benzisothiazolin-3-one. Samples 1 to 4 each contained water to make up to 100 wt. %. A water-wet filter cake was used as the BIT source (85%).
"0 = minimal crystal formation;
"−" = heavily crystallized;
"+"= clearly dissolved, without crystals

The invention claimed is:

1. An aqueous biocide composition, containing the following components:
   (a) 9 wt. % to 11.5 wt. % 1,2-benzisothiazolin-3-one;
   (b) a dissolved alkalizing agent, containing 0.95 to 1.05 mol sodium and potassium hydroxide, each based on one mol of the 1,2-benzisothiazolin-3-one present as component (a), and
   (c) more than 60 wt. % water,
characterized in that the composition:
   (i) has a pH value in the range of pH 9.5 to pH 11.9; and
   (ii) the molar fraction of sodium ions, based on the sodium and potassium ions contained in the composition, is in the range of 15 to 45 mol %.

2. The biocide composition according to claim 1, characterized in that the molar fraction of sodium ions, based on the sodium and potassium ions contained in the composition, is in the range of 20 to 39 mol %.

3. The biocide composition according to claim 1, characterized in that the biocide composition has a pH value in the range of pH 10.0 to pH 11.5.

4. The biocide composition according to claim 1, characterized in that the biocide composition has a water content in the range of 70 wt. % to 89 wt. %.

5. The biocide composition according to claim 1, characterized in that the biocide composition has a viscosity at 20° C., measured using a Brookfield spindle 1 at 30 rpm, of <50 mPas.

6. The biocide composition according to claim 1, characterized in that the biocide composition contains 9 wt. % to 10.5 wt. % 1,2-benzisothiazolin-3-one.

7. The biocide composition according to claim 1, characterized in that the biocide composition furthermore contains:
   (d) at least one 2-mercaptopyridine N-oxide or the salt thereof.

8. The biocide composition according to claim 1, characterized in that the composition is substantially free of volatile organic compounds (VOC), glycols, derivatives of glycols, glycerol and/or derivatives of glycerol.

TABLE 2

| Sample | Concentrations [wt. %] | | | | Stability | | | | | | | | Molar ratio |
|---|---|---|---|---|---|---|---|---|---|---|---|---|---|
| | BIT | KOH | NaOH | pH | RT | 12° C. | 10° C. | 5° C. | 2° C. | 0° C. | −2° C. | −5° C. | K/Na |
| 8 | 9 | 2.43 | 0.67 | 11 | + | + | + | + | + | + | + | ○ | 72/28 |
| 9 | 9.5 | 2.57 | 0.71 | 11 | + | + | + | + | + | + | + | − | 72/28 |
| 10 | 10 | 2.70 | 0.75 | 11.1 | + | + | + | + | + | + | ○ | − | 72/28 |
| 11 | 10.5 | 2.84 | 0.79 | 11.1 | + | + | + | + | ○ | ○ | − | − | 72/28 |
| 12 | 11 | 2.97 | 0.82 | 11.1 | + | + | + | + | ○ | − | − | − | 72/28 |
| 13 | 12 | 3.24 | 0.90 | 11.1 | + | + | + | + | − | − | − | − | 72/28 |
| 14 | 13 | 3.51 | 0.97 | 11.1 | + | + | + | + | − | − | − | − | 72/28 |
| 15 | 14 | 3.78 | 1.05 | 11.1 | + | + | + | + | − | − | − | − | 72/28 |
| 16 | 15 | 4.05 | 1.12 | 11.1 | + | + | + | ○ | − | − | − | − | 72/28 |
| 17 | 16 | 4.32 | 1.20 | 11.1 | + | + | − | − | − | − | − | − | 72/28 |
| 18 | 17 | 4.59 | 1.27 | 11.1 | + | + | − | − | − | − | − | − | 72/28 |
| 19 | 18 | 4.86 | 1.35 | 11.1 | + | + | − | − | − | − | − | − | 72/28 |
| 20 | 19 | 5.13 | 1.42 | 11.1 | + | + | − | − | − | − | − | − | 72/28 |
| 21 | 20 | 5.40 | 1.50 | 11.1 | + | − | − | − | − | − | − | − | 72/28 |
| V8 | 15 | 5.61 | — | 11 | − | − | − | − | − | − | − | − | 100/0 |
| V9 | 15 | — | 4.01 | 11 | − | − | − | − | − | − | − | − | 0/100 |
| V10 | 12 | 4.51 | — | 11.2 | + | ○ | ○ | − | − | − | − | − | 100/0 |

BIT: 1,2-benzisothiazolin-3-one. Samples 1 to 4 each contained water to make up to 100 wt. %. A water-wet filter cake was used as the BIT source (85%).
"0 = minimal crystal formation;
"−" = heavily crystallized;
"+"= clearly dissolved, without crystals 9. A hydrous technical product, selected from cleaning and household products, plastic dispersions, paints, plasters, adhesives, sealing compounds, paper coating compounds, textile softening and sizing agents, detergent base materials, surfactants, polishing agents, spinning baths, cooling lubricants, leather treatment agents, and silicone and bitumen emulsions, containing the biocide composition according to claim 1.

10. The hydrous technical product according to claim 9, containing a biocide composition according to any one of claims 1 to 8 in a content of 0.01 to 5 wt. %.

11. A method for controlling the growth of at least one microorganism in an aqueous liquid, comprising the step of adding a biocide composition, containing the following components:
   (a) 9 wt. % to 11.5 wt. % 1,2-benzisothiazolin-3-one;
   (b) a dissolved alkalizing agent, containing 0.95 to 1.05 mol sodium and potassium hydroxide, each based on one mol of the 1,2-benzisothiazolin-3-one present as component (a), and
   (c) more than 60 wt. % water,
characterized in that the composition:
   (i) has a pH value in the range of pH 9.5 to pH 11.9; and
   (ii) the molar fraction of sodium ions, based on the sodium and potassium ions present in the composition, is in the range of 15 to 45 mol %, to an aqueous liquid so that the growth of the at least one microorganism in the fluid is inhibited.

12. The method according to claim 11, characterized in that the aqueous liquid is a cooling lubricant, a cleaning product, or a household product.

* * * * *